United States Patent
Gernert et al.

(10) Patent No.: US 7,206,849 B1
(45) Date of Patent: Apr. 17, 2007

(54) COMMUNICATION IN A WIRELESS COMMUNICATIONS NETWORK WHEN A MOBILE COMPUTER TERMINAL MAY BE UNREACHABLE

(75) Inventors: Alex M. Gernert, Cupertino, CA (US); Daniel L. Scheve, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/686,123

(22) Filed: Oct. 10, 2000

(51) Int. Cl.
*G06F 15/16* (2006.01)
*G06F 1/00* (2006.01)
*H04J 3/24* (2006.01)
*H04N 11/00* (2006.01)

(52) U.S. Cl. .............. 709/229; 370/249; 455/421; 713/323

(58) Field of Classification Search ........ 709/200, 709/229; 370/349; 455/421, 466; 713/300–340
See application file for complete search history.

(56) References Cited

U.S. PATENT DOCUMENTS

| | | | |
|---|---|---|---|
| 4,135,149 A | 1/1979 | Takahashi et al. | 340/147 R |
| 4,154,985 A | 5/1979 | Munter | 179/15 |
| 4,698,748 A * | 10/1987 | Juzswik et al. | 713/322 |
| 4,719,564 A | 1/1988 | Hara | 364/200 |
| 4,775,996 A * | 10/1988 | Emerson et al. | 379/56.3 |
| 4,897,866 A | 1/1990 | Majmudar | 379/94 |
| 5,029,183 A * | 7/1991 | Tymes | 370/338 |
| 5,119,479 A | 6/1992 | Arai et al. | 395/275 |
| 5,134,708 A | 7/1992 | Marui et al. | 455/33.2 |
| 5,170,252 A | 12/1992 | Gear et al. | 358/181 |
| 5,199,062 A | 3/1993 | Von Meister et al. | 379/67 |
| 5,210,398 A | 5/1993 | Metlitsky | 235/462 |
| 5,233,686 A | 8/1993 | Rickenbach et al. | 395/158 |
| 5,274,841 A | 12/1993 | Natarajan et al. | 455/33 |
| 5,280,498 A | 1/1994 | Tymes et al. | 375/1 |

(Continued)

FOREIGN PATENT DOCUMENTS

EP 0 782 297 A2 7/1997

(Continued)

OTHER PUBLICATIONS

Network Working Group. "Request for Comments (RFG) 2002: IP Mobility Support", C. Perkins (Editor), Oct. 1996.*

(Continued)

*Primary Examiner*—David Wiley
*Assistant Examiner*—George C. Neurauter, Jr.
(74) *Attorney, Agent, or Firm*—Sierra Patent Group, Ltd.

(57) ABSTRACT

A method and apparatus for communication between a mobile computer terminal and a host computer in a system in which it is necessary for the mobile computer terminal to send a message to the host computer at a particular time. The specific time at which the mobile computer terminal must send a message to the host computer is first determined. Then, a timer or clock is programmed to wake up the mobile computer terminal at the specific time. A sleep mode may be entered, which may be interrupted at the specific time to send the message. This will normally allow a mobile computer terminal to maintain its lease on an IP address despite being out of range of a wireless network.

8 Claims, 10 Drawing Sheets

U.S. PATENT DOCUMENTS

| | | | | |
|---|---|---|---|---|
| 5,280,621 A | | 1/1994 | Barnes et al. | 395/800 |
| 5,317,630 A | | 5/1994 | Feinberg et al. | 379/94 |
| 5,355,518 A | * | 10/1994 | Kindinger et al. | 340/7.34 |
| 5,373,548 A | * | 12/1994 | McCarthy | 455/462 |
| 5,379,374 A | | 1/1995 | Ishizaki et al. | 395/155 |
| 5,392,331 A | | 2/1995 | Patsiokas et al. | 379/63 |
| 5,426,690 A | * | 6/1995 | Hikuma et al. | 455/411 |
| 5,442,246 A | | 8/1995 | Azegami et al. | 326/38 |
| 5,442,805 A | | 8/1995 | Sagers et al. | 455/33.1 |
| 5,467,164 A | | 11/1995 | Wells et al. | 355/23 |
| 5,525,788 A | | 6/1996 | Bridgelall et al. | 235/462 |
| 5,528,621 A | | 6/1996 | Heiman et al. | 375/200 |
| 5,530,498 A | | 6/1996 | Miyazaki et al. | 354/21 |
| 5,548,359 A | | 8/1996 | Wakabayashi | 354/21 |
| 5,560,021 A | * | 9/1996 | Vook et al. | 713/323 |
| 5,581,707 A | | 12/1996 | Kuecken | 395/200 |
| 5,604,516 A | | 2/1997 | Herrod et al. | 345/168 |
| 5,634,058 A | | 5/1997 | Allen et al. | 395/712 |
| 5,635,940 A | | 6/1997 | Hickman et al. | 342/389 |
| 5,640,001 A | * | 6/1997 | Danielson et al. | 74/606 R |
| 5,652,753 A | | 7/1997 | Kopp et al. | 370/489 |
| 5,652,782 A | | 7/1997 | Hughes-Hartogs | 379/27 |
| 5,668,803 A | | 9/1997 | Tymes et al. | 370/312 |
| 5,675,139 A | | 10/1997 | Fama | 235/472 |
| 5,682,534 A | | 10/1997 | Kapoor et al. | 395/684 |
| 5,692,197 A | * | 11/1997 | Narad et al. | 713/323 |
| 5,694,580 A | * | 12/1997 | Narita et al. | 296/35.1 |
| 5,699,275 A | | 12/1997 | Beasley et al. | 364/514 R |
| 5,703,349 A | | 12/1997 | Meyerson et al. | 235/472 |
| 5,724,417 A | * | 3/1998 | Bartholomew et al. | 379/211.05 |
| 5,732,349 A | | 3/1998 | Sanpei et al. | 455/435 |
| 5,737,706 A | * | 4/1998 | Seazholtz et al. | 455/466 |
| 5,740,455 A | | 4/1998 | Pavley et al. | 395/777 |
| 5,748,881 A | | 5/1998 | Lewis et al. | 395/184 |
| 5,748,974 A | | 5/1998 | Johnson | 395/759 |
| 5,751,962 A | | 5/1998 | Fanshier et al. | 395/684 |
| 5,757,021 A | | 5/1998 | Dewaele | 250/581 |
| 5,764,992 A | | 6/1998 | Kullick et al. | 395/712 |
| 5,777,580 A | | 7/1998 | Janky et al. | 342/457 |
| 5,777,590 A | | 7/1998 | Saxena et al. | 345/89 |
| 5,778,377 A | | 7/1998 | Marlin et al. | 707/103 |
| 5,778,380 A | | 7/1998 | Siefert | 707/103 |
| 5,784,544 A | | 7/1998 | Stevens | 395/112 |
| 5,787,288 A | | 7/1998 | Nagata | 395/712 |
| 5,790,946 A | * | 8/1998 | Rotzoll | 455/41 |
| 5,790,952 A | * | 8/1998 | Seazholtz et al. | 455/432.1 |
| 5,801,696 A | | 9/1998 | Roberts | 345/340 |
| 5,802,381 A | | 9/1998 | Matsumoto | 395/779 |
| 5,805,997 A | * | 9/1998 | Farris | 455/461 |
| 5,809,414 A | * | 9/1998 | Coverdale et al. | 455/421 |
| 5,812,819 A | * | 9/1998 | Rodwin et al. | 703/23 |
| 5,814,803 A | | 9/1998 | Olmstead et al. | 235/462 |
| 5,818,830 A | | 10/1998 | Daane | 370/347 |
| 5,819,173 A | | 10/1998 | Lawrence et al. | 455/414 |
| 5,821,523 A | | 10/1998 | Bunte et al. | 235/472 |
| 5,845,283 A | | 12/1998 | Williams et al. | 707/101 |
| 5,845,303 A | | 12/1998 | Templeman | 707/517 |
| RE36,056 E | * | 1/1999 | Nonami | 455/321 |
| 5,857,155 A | | 1/1999 | Hill et al. | 455/456 |
| 5,862,345 A | * | 1/1999 | Okanoue et al. | 370/312 |
| 5,865,546 A | | 2/1999 | Ganthier et al. | 400/489 |
| 5,867,782 A | * | 2/1999 | Yoon | 455/421 |
| 5,884,024 A | * | 3/1999 | Lim et al. | 713/201 |
| 5,909,581 A | | 6/1999 | Park | 395/712 |
| 5,911,044 A | | 6/1999 | Lo et al. | 395/200 |
| 5,918,159 A | | 6/1999 | Fomukong et al. | 455/38.1 |
| 5,920,821 A | * | 7/1999 | Seazholtz et al. | 455/466 |
| 5,938,732 A | * | 8/1999 | Lim et al. | 709/226 |
| 5,940,771 A | * | 8/1999 | Gollnick et al. | 455/517 |
| 5,951,639 A | | 9/1999 | MacInnis | 709/217 |
| 5,983,115 A | | 11/1999 | Mizikovsky | 455/512 |
| 5,997,168 A | | 12/1999 | Harper et al. | 364/191 |
| 5,999,799 A | * | 12/1999 | Hu et al. | 455/67.7 |
| 6,000,000 A | | 12/1999 | Hawkins et al. | 707/201 |
| 6,002,918 A | * | 12/1999 | Heiman et al. | 340/7.38 |
| 6,009,274 A | | 12/1999 | Fletcher et al. | 395/712 |
| 6,031,830 A | | 2/2000 | Cowan | 370/338 |
| 6,034,685 A | | 3/2000 | Kuriyama et al. | 345/341 |
| 6,035,212 A | | 3/2000 | Rostoker et al. | 455/552 |
| 6,042,012 A | | 3/2000 | Olmstead et al. | 235/462.41 |
| 6,067,297 A | | 5/2000 | Beach | 370/389 |
| 6,076,099 A | | 6/2000 | Chen et al. | 709/202 |
| 6,081,830 A | | 6/2000 | Schindler | 709/204 |
| 6,101,505 A | | 8/2000 | Sun | 707/203 |
| 6,111,016 A | | 8/2000 | Katayama et al. | 525/92 E |
| 6,122,409 A | | 9/2000 | Boggs et al. | 382/276 |
| 6,128,483 A | | 10/2000 | Doiron et al. | 455/419 |
| 6,128,661 A | | 10/2000 | Flanagin et al. | 709/227 |
| 6,138,915 A | | 10/2000 | Danielson et al. | 235/472.02 |
| 6,144,552 A | | 11/2000 | Whitcher et al. | 361/681 |
| 6,164,545 A | | 12/2000 | Danielson | 235/472 |
| 6,192,259 B1 | | 2/2001 | Hayashi | 455/575 |
| 6,208,812 B1 | | 3/2001 | Sato et al. | 396/210 |
| 6,212,175 B1 | * | 4/2001 | Harsch | 370/338 |
| 6,237,053 B1 | | 5/2001 | Herrod et al. | 710/654 |
| 6,252,588 B1 | | 6/2001 | Dawson | 345/329 |
| 6,311,895 B1 | | 11/2001 | Olmstead et al. | 235/462.41 |
| 6,328,213 B1 | | 12/2001 | He et al. | 235/462.25 |
| 6,340,114 B1 | | 1/2002 | Correa et al. | 235/462.22 |
| 6,353,732 B1 | | 3/2002 | Dvorak | 455/67.3 |
| 6,377,982 B1 | | 4/2002 | Rai et al. | 709/217 |
| 6,382,513 B1 | | 5/2002 | Dvorkis et al. | 235/462.37 |
| 6,473,411 B1 | * | 10/2002 | Kumaki et al. | 370/331 |
| 6,546,425 B1 | * | 4/2003 | Hanson et al. | 709/227 |
| 2001/0041568 A1 | | 11/2001 | Hughes et al. | 455/434 |

FOREIGN PATENT DOCUMENTS

| | | |
|---|---|---|
| EP | 0 837 406 A2 | 4/1998 |
| JP | 4 060 19811 A | 1/1994 |
| JP | 4 061 10873 A | 4/1994 |
| JP | 2002-024754 | 7/2000 |

OTHER PUBLICATIONS

Droms, R. "Request for Comments (RFC) 2131: Dynamic Host Configuration Protocol", published by Network Working Group, Mar. 1997, 45 pages.*

D.R. Dewar, "Data Packer", *IBM Technical Disclosure Bulletin*, Jun. 1982, vol. 25, No. 1, pp. 265-268.

U.S. Appl. No. 09/107,237, Joseph Cabana, et al., filed Jun. 30, 1998.

U.S. Patent Appl. No. 09/684,514.

Visited the website at address http://www.PVS.com on Jul. 8, 2002.

* cited by examiner

| Hex | Dec | | | |
|---|---|---|---|---|
| 0 | 0 | Ethernet Header (14 bytes) | 01 | Target Ethernet Address (6 bytes) |
| 1 | 1 | | 02 | |
| 2 | 2 | | 03 | |
| 3 | 3 | | 04 | |
| 4 | 4 | | 05 | |
| 5 | 5 | | 06 | |
| 6 | 6 | | 07 | Source Ethernet Address (6 bytes) |
| 7 | 7 | | 08 | |
| 8 | 8 | | 09 | |
| 9 | 9 | | 0a | |
| a | 10 | | 0b | |
| b | 11 | | 0c | |
| c | 12 | | 08 | Protocol Type (0x0800=IP) |
| d | 13 | | 00 | |
| e | 14 | IP Header (20 bytes) | 45 | Version=4, IP Header Len (Words)=5 |
| f | 15 | | 00 | Service Type |
| 10 | 16 | | 00 | Total Length=0x001d(29 bytes:20 byte IPHeader plus 8-byte UDP header plus 1-byte user data |
| 11 | 17 | | 1d | |
| 12 | 18 | | e0 | Datagram Id=0xe0a1 |
| 13 | 19 | | a1 | |
| 14 | 20 | | 40 | Flag 0x4 DO_NOT_FRAGMENT |
| 15 | 21 | | 00 | Fragment Offset=0x000 |
| 16 | 22 | | 40 | Time-to-Live=0x40 |
| 17 | 23 | | 11 | IP Protocol=0x11(UDP) |
| 18 | 24 | | da | IP Header Checksum=0xda1b |
| 19 | 25 | | 1b | |
| 1a | 26 | | 80 | IP Address of Source=128.1.192.7 |
| 1b | 27 | | 01 | |
| 1c | 28 | | c0 | |
| 1d | 29 | | 07 | |
| 1e | 30 | | 80 | IP Address of Destination=128.1.192.8 |
| 1f | 31 | | 01 | |
| 20 | 32 | | c0 | |
| 21 | 33 | | 08 | |
| 22 | 34 | UDP Header (8 bytes) | 00 | Source Port=0x0007 (echo datagram) |
| 23 | 35 | | 07 | |
| 24 | 36 | | 30 | Destination Port=0x3018 |
| 25 | 37 | | 18 | |
| 26 | 38 | | 00 | UDP Length=0x0009 (8-byte UDP Header plus 1-byte user data) |
| 27 | 39 | | 09 | |
| 28 | 40 | | 0c | UDP Checksum=0x0cf8 |
| 29 | 41 | | f8 | |
| 2a | 42 | User Data (Variable) | 67 | 1 byte user datagram="g" |

Rows 0–41 bracketed as 60; row 42 bracketed as 62.

FIG. 3

```
┌─────────────────────────┐              ┌─────────────────────────┐
│ configure the operating │─80           │ configure the operating │
│ characteristics of the  │   100╲       │ characteristics of the  │
│    at least one mobile  │              │    at least one mobile  │
│    computer terminal to │              │    computer terminal to │
│       correspond to     │              │       correspond to     │
│   data field            │              │   data field            │
│   characteristics       │              │   characteristics       │
│   required by the       │              │   required by the       │
│   application program   │              │   application program   │
│   running on the        │              │   running on the        │
│   host computer.        │              │   host computer.        │
└───────────┬─────────────┘              └───────────┬─────────────┘
            ▼                                        ▼
┌─────────────────────────┐              ┌─────────────────────────┐
│  utilize the at least   │─82           │  utilize the at least   │
│  one mobile computer    │   102╲       │  one mobile computer    │
│   terminal to           │              │   terminal to           │
│  automatically acquire  │              │  automatically acquire  │
│  data at the remote     │              │  data from barcode      │
│  site in response to    │              │  symbols at the remote  │
│  a data acquisition     │              │  site in response to    │
│  program running on     │              │  a data acquisition     │
│  the at least one       │              │  program running on     │
│  mobile computer        │              │  the at least one       │
│  terminal.              │              │  mobile computer        │
│                         │              │  terminal.              │
└───────────┬─────────────┘              └───────────┬─────────────┘
            ▼                                        ▼
┌─────────────────────────┐              ┌─────────────────────────┐
│ transform the acquired  │─84           │ transform the acquired  │
│ data into a data        │   104╲       │ data into a data        │
│ structure in the mobile │              │ structure in the mobile │
│ computer terminal in    │              │ computer terminal in    │
│ accordance with the     │              │ accordance with the     │
│ data field              │              │ data field              │
│ characteristics         │              │ characteristics         │
│ required by the         │              │ required by the         │
│ application program     │              │ application program     │
│ running on the          │              │ running on the          │
│ host computer.          │              │ host computer.          │
└───────────┬─────────────┘              └───────────┬─────────────┘
            ▼                                        ▼
┌─────────────────────────┐              ┌─────────────────────────┐
│  transfer the data      │─86           │  transfer the data      │
│  structure to the host  │   106╲       │  structure to the host  │
│  computer over a        │              │  computer over a        │
│  wireless communications│              │  wireless communications│
│  network.               │              │  network.               │
└─────────────────────────┘              └─────────────────────────┘

FIG. 4                                   FIG. 5
```

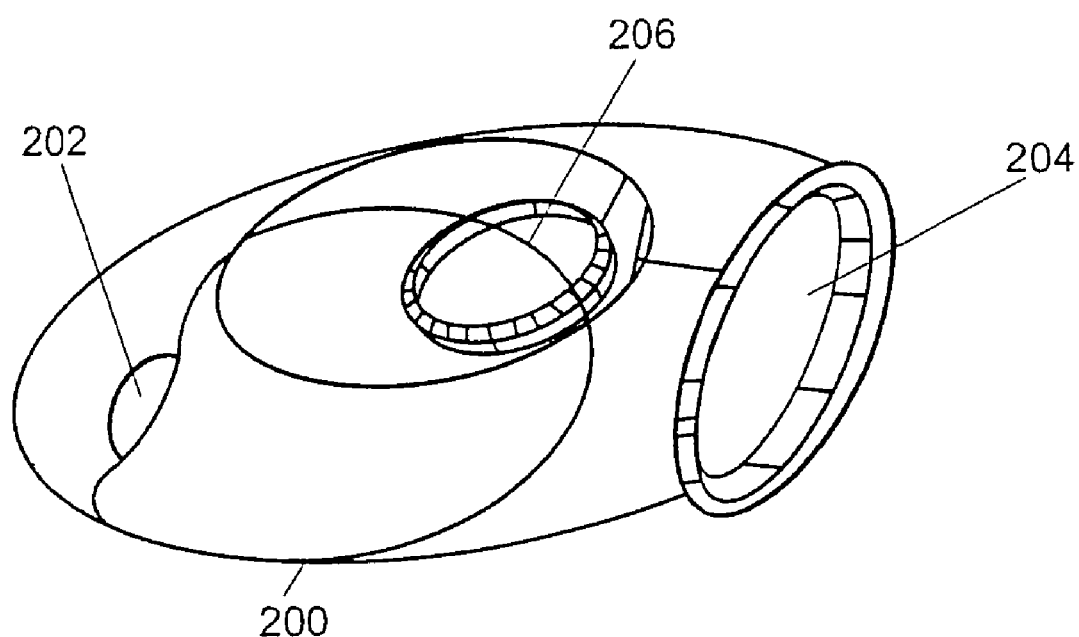
FIG. 10C
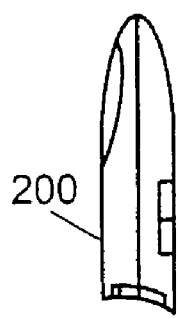
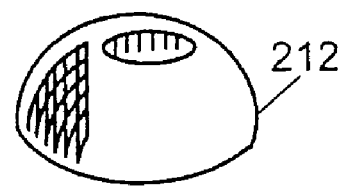
FIG. 11

COMMUNICATION IN A WIRELESS COMMUNICATIONS NETWORK WHEN A MOBILE COMPUTER TERMINAL MAY BE UNREACHABLE

BACKGROUND OF THE INVENTION

1. Field of the Invention

The present invention relates to the field of computer data base processing. More specifically, the present invention relates to data formatting, data base updating, synchronization and reconciliation between a host or server computer and mobile data collection terminals.

2. The Background Art

Computer client/server systems have been designed which utilize a host computer and one or more mobile terminals. The host computer may be a mainframe computer, while the mobile terminals are usually hand held, less powerful portable computers. By using less powerful mobile terminals, it is possible to reduce the size and cost of each terminal. This can be accomplished by having systems which require the terminals to emulate more sophisticated desktop terminals and perform only specific tasks or processes required by the host computer.

One application such terminals are particularly suited for is data collection. Bar code symbols or other forms of data may be entered at a mobile terminal and then transferred to a host computer for processing or manipulation. There are many types of tasks that may be performed by mobile terminals, and data collection is only one example.

Additionally, data collection and other uses for mobile terminals may not necessarily be stationary tasks. Many times, the user inputting the data must move around in order to properly collect the data. For example, if a user wanted to perform inventory tasks, they may walk around a warehouse full of boxes to count and visually inspect each box. Then they would have to return to a fixed mobile terminal to input the data. It would be much more efficient if the user could bring the mobile terminal with him as he performed the inventory tasks and enter each piece of data as he receives it.

The advent of wireless technology and the miniaturization of the computer has allowed for palmtop or other small computers, running on a wireless network, to be used in data collection and other tasks. An example of such a device is disclosed in Herrod et. al., U.S. Pat. No. 5,604,516, hereby expressly incorporated by reference. The user may carry the mobile terminal around with him and input data as necessary.

A mobile computer network is depicted in FIG. 1. Host computer 10 may be connected to one or more mobile computer terminals 12, 14 through a wireless communications network. Communication may be accomplished using RF signals with the host computer connected in a local network along with stationary base stations (or "access points") 16. The mobile computer terminals 12, 14 each have their own transmitter/receiver 18, 20, respectively, which communicate to and from the access points. The access points may be placed at various points around an area in which the mobile computer terminals can communicate with the host computer. For example, access points may be placed at various places around a warehouse if the mobile computer terminals are to be used for inventory tasks. When a mobile computer terminal 12 is in the range of one of the access points, connection and association may be established between the transmitter/receiver 18 of the mobile computer terminal 12 and the access point 16. However, if a mobile computer terminal 14 is out of range of one of the access point 16, connection and association between the transmitter/receiver 20 of the mobile computer and an access point 16 is not established. Examples of similar communications systems are disclosed in Tymes, U.S. Pat. No. 5,029,183, Tymes et al., U.S. Pat. No. 5,280,498, Heiman et al., U.S. Pat. No. 5,528,621, and Tymes, U.S. Pat. No. 5,668,803, all hereby expressly incorporated by reference.

In Tymes, U.S. Pat. No. 5,029,183, a packet data communication network is described where remote terminals may link to intermediate base stations through wireless RF communication wherein a packet is transmitted during a first time period and an acknowledge packet is received during a second time period occurring only at a selected time delay after the first time period. In Tymes et al., U.S. Pat. No. 5,280,498, a packet data communication network is described where remote terminals may link to intermediate base stations through wireless RF communication wherein a packet is transmitted during a first time period and an acknowledge packet is received during a second time period occurring only at a selected time delay after the first time period, with the acknowledge packet including a number sequence used to decode the packet. In Tymes, U.S. Pat. No. 5,668,803, a packet data communication network is described where remote terminals may link to intermediate base stations through wireless RF communication wherein a packet is transmitted during a first time period and an acknowledge packet is received during a second time period occurring only at a selected time delay after the first time period and a remote unit is alerted that a message is waiting to be picked up by including a message in an acknowledge packet. In Heiman et al., U.S. Pat. No. 5,528,621, a packet data communication network is described where remote terminals may link to intermediate base stations through wireless RF communication utilizing a frequency-hopping transmission method, with the base stations returning reply packets containing synchronization information. Communication may also be accomplished using other wireless communications technologies.

It is common to run an application on the host computer 10 that requires data be entered in a certain format or sequence, or more specifically, a form or template having certain data entry fields within the application fills a host database 22 with data collected on the mobile computer terminals. A problem arises, however, in that the data collected on the mobile computer terminals may not be in the proper format for simple insertion into data entry fields of the application running on the host computer. For example, an inventory database application program may currently be running on the host computer and that application may require that both an address field (in alphanumeric form) and a zip code (in numeric form) be filled for items in inventory. The data will eventually be stored in a host database 22. This data may be acquired by scanning bar code symbols off of each item in inventory. When the user scans the bar code symbols into the mobile computer terminal, the terminal may have no way of knowing in what order the application is requesting the data entry fields be filled (e.g. does he enter address then zip code or zip code then address?).

Additionally, the mobile computer terminal may not know what types of data to collect. In the above example, it may not know if it is supposed to accept address and zip code data, or address and phone number data.

In the past, these problems were remedied using one of two approaches. First, the mobile computer terminal could be set up in advance to accept only certain types of data, and only in a specific order. For example, the mobile computer terminal may be set up to receive only address and zip code information, and only in that order. This approach, however, limits the flexibility of the system in that once the mobile computer terminal is set up, it may be difficult or impossible to alter the input types. A problem occurs if the user suddenly decides that the name of the product should be entered as well, or that the zip code is no longer necessary.

The second approach to these problems is to run a special application or applications on the mobile computer terminal. This application could convert the data into the proper format, or alter the ordering of the received data to match that of the requirements of the application running on the host computer. This approach, however, uses up valuable processing power and memory space on the mobile computer terminal.

Another problem that arises in such wireless computer networks occurs when a user gets cut off from the network. The most common cause of this problem is when a user walks to a point that is out of range of the wireless transmitter/receivers or access points. However, this problem may also be encountered due to electromagnetic interference as well as other problems that may interfere with the wireless network.

These interruptions can cause serious problems in the case of wireless data collection. If the mobile computer terminal is used to collect data and transmit data to a host computer, and an interruption occurs, the mobile computer terminal may continue to transmit its information. This may result in the loss of information since the data transmitted during this interruption is never received by the host computer. This may cause drastic consequences. For example, if the host computer is running an inventory application, the data lost during the interruption causes the inventory count to be incorrect. Additionally, it may be difficult or impossible to determine at what point the interruption occurred or which data was being input at that time, so the entire inventory procedure may have to be restarted due to even a short interruption in the wireless network.

Another problem that potentially arises when a user gets cut off from the network occurs where data collected by the mobile terminal is time sensitive. For example, in a wireless computer network set up for a taxi service, each taxicab may periodically send information as to its location to a host computer for use in aiding in dispatching. Suppose connection with one of the taxicabs is broken at time $t_1$, and the taxicab checks in with its location at time $t_2$. Then at time $t_3$, connection is re-established. The data sent to the host computer will represent the location of the taxicab at time $t_2$, but the host computer will not know if the data it receives it receives represents the location of the taxi-cab at time $t_2$ or $t_3$. This may be referred to as a "data freshness" problem.

Another potential "data freshness" problem occurs in the case where the mobile data terminals may be sending data which "competes" with data from other mobile data terminals. An example of this is the case where the host computer maintains an inventory list of manufactured goods and the mobile computer terminals are used to make sales of those goods and reserve the goods for shipment. If there exist only ten manufactured units of a specific good (as tracked by the host computer database), and a first mobile computer terminal processes a sale for ten units of a specific good at time $t_1$, while a second mobile computer terminal processes a sale for ten units for a specific good at time $t_2$, then ideally, the customer from the sale on the first mobile computer terminal will have his goods shipped immediately, while the customer from the sale on the second mobile computer terminal will have his goods placed on backorder until more of the goods can be manufactured. However, if the first mobile computer terminal went out of range between $t_1$ and $t_2$, and connection was not re-established until after $t_2$, then the wrong customer will have his goods backordered.

OBJECTS OF THE INVENTION

It is therefore an object of the present invention to provide an application that can easily handle the formatting and ordering issues that arise when data is input into a mobile computer terminal for eventual incorporation into an application located on a host computer.

It is a further object of the present invention to provide an application that prevents the loss of data when interruptions in the wireless network occur.

It is a further object of the present invention to provide an application that can easily handle freshness issues.

BRIEF DESCRIPTION OF THE INVENTION

A method for communication between a host computer and at least one mobile computer terminal which provides an efficient way of running a computer network where at least one mobile computer terminal operates at a remote site, has selectable operating characteristics, and is connected to the host computer through a wireless communications network, and wherein the host computer executes an application program in which data is enter from at least one mobile computer terminal and processed by the application program, the method comprising the steps of: configuring the operating characteristics of the mobile computer terminal to correspond to data field characteristics required by the application program running on the host computer; utilizing at least one mobile computer terminal to automatically acquire data at the remote site in response to a data acquisition program running on at least mobile computer terminal; transforming the acquired data into a data structure in the mobile computer terminal in accordance with the data field characteristics required by the application program running on the host computer; and transferring the data structure to the host computer over the wireless communications network.

A method and apparatus for communication between a mobile computer terminal and a host computer in a system in which it is necessary for the mobile computer terminal to send a message to the host computer at a particular time. The specific time at which the mobile computer terminal must send a message to the host computer is first determined. Then, a timer or clock is programmed to wake up the mobile computer terminal at the specific time. A sleep mode may be entered, which may be interrupted at the specific time to send the message. This will normally allow a mobile computer terminal to maintain its lease on an IP address despite being out of range of a wireless network.

BRIEF DESCRIPTION OF THE DRAWING FIGURES

FIG. 3 is a block diagram depicting a data packet transmitted between a host computer and at least one mobile computer terminal.

FIG. 4 is a flow diagram depicting a method for communication between a host computer and at least one mobile computer terminal in accordance with a first embodiment of the present invention.

FIG. 5 is a flow diagram depicting a method of communication between a host computer and at least one mobile computer terminal designed to accept bar code symbols as an input in accordance with a second embodiment of this invention.

FIG. 10C illustrates a perspective view of the portable scanning device in accordance with this invention.

FIG. 11 illustrates a connection for a portable scanning device to a network in accordance with this invention.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

Figure 1:
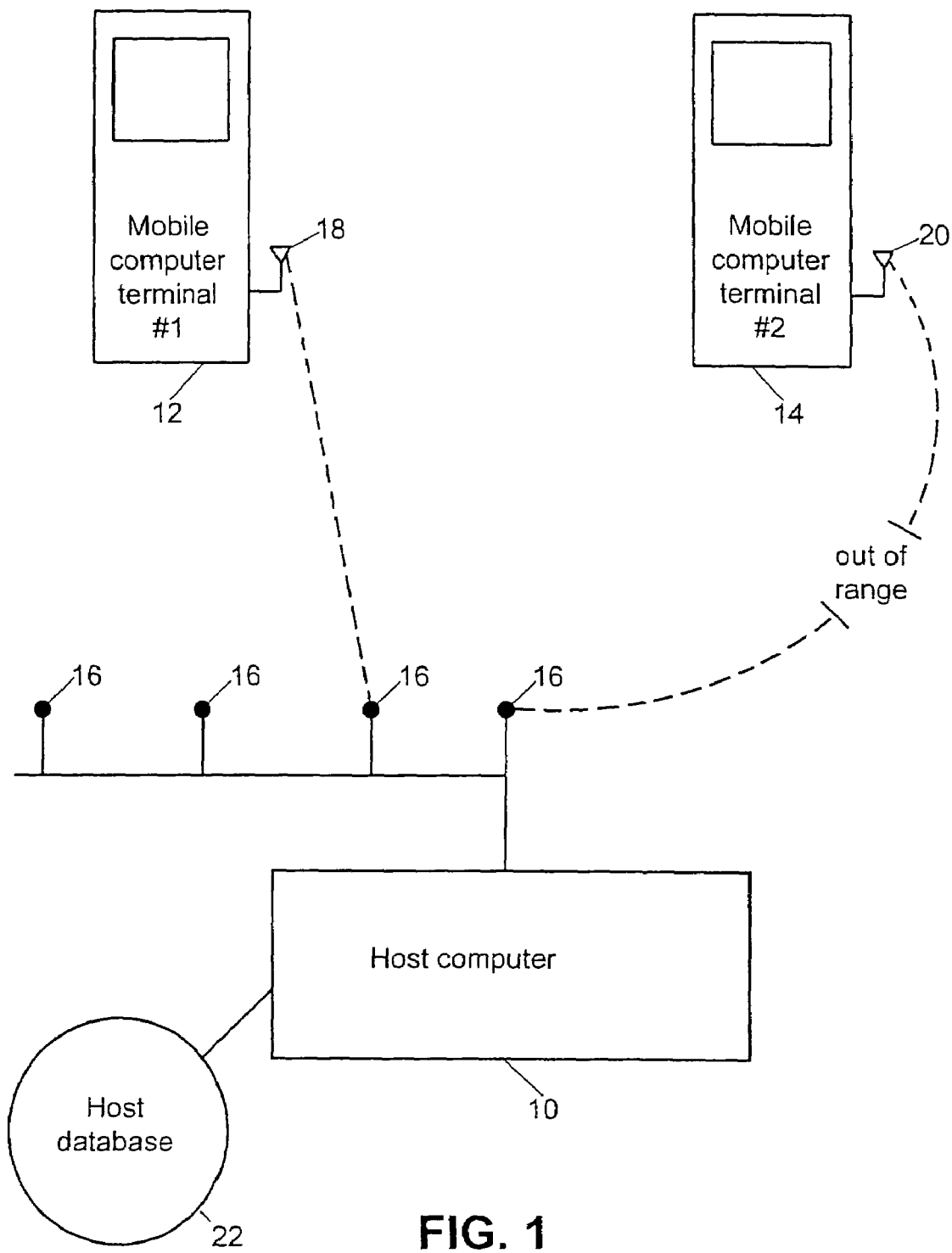
FIG. 1 is a block diagram illustrating a mobile computer network.
Figure 2:
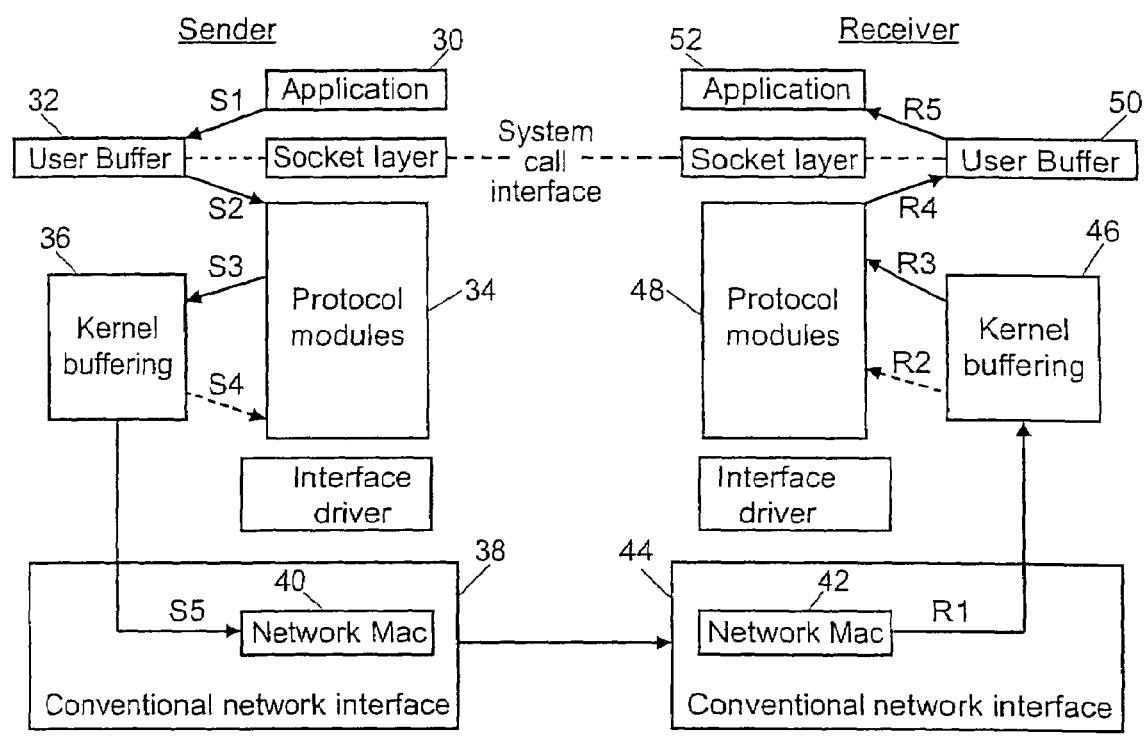
FIG. 2 is a flow diagram depicting a method for communication between a host computer and at least one mobile computer terminal in accordance with a first embodiment of the present invention.

FIG. 2 is a flow diagram depicting the typical data flow between a sender and a receiver in a network environment. At 30, an application sends information to a user buffer 32, which is then read back using protocol modules 34. The data is then buffered through kernel 36 before sent through an interface 38 to a network media access control (MAC) 40. Similarly, when data is received by a Network MAC 42 in an interface 44, it is subsequently buffered through a kernel 46, read out by protocol modules 48, passed into a user buffer 50 and eventually used by an application 52.

Data is generally passed through a network in the form of packets. Each packet contains a header containing various information to be used by the hardware and software associated with a network in determining how to handle each packet. One such packet is depicted in FIG. 3, including a header portion 60 and a data portion 62.

FIG. 4 depicts a method for communication between a host computer and at least one mobile computer terminal in accordance with a first embodiment of the present invention. This embodiment allows the host computer application to switch from application to application, and to implement new applications, without having the mobile computer terminal set up in advance to handle a specific formatting scheme.

At step 80, the operating characteristics of the at least one mobile computer terminal are configured to correspond to data field characteristics required by the application program running on the host computer. At step 82, the at least one mobile computer terminal is utilized to automatically acquire data at the remote site in response to a data acquisition program running on the at least one mobile computer terminal. At step 84, the acquired data is transformed into a data structure in the mobile computer terminal in accordance with the data characteristics required by the application program running on the host computer. Finally, at step 86, the data structure is transferred to the host computer over a wireless network.

FIG. 5 depicts a method for communication between a host computer and at least one mobile computer terminal designed to accept bar code symbols as input in accordance with a second embodiment of the present invention. This may include utilizing one-dimensional bar code symbols (as known in the art) as well as two-dimensional bar code symbols, such as PDF417 bar code symbol. Two dimensional bar code symbols generally reduce the height of traditional one-dimensional symbols, and then stacking distinct rows of such one dimensional symbols. Therefore, two-dimensional bar code symbols can store much more information than traditional one-dimensional bar code symbols (a single PDF417 symbol may carry up to 1.1 kilobytes of machine readable data in a space no larger than a standard bar code symbol). Additionally, unlike traditional one-dimensional bar code symbols, which represent a pointer or address to a database, PDF417 symbols are the database itself.

A PDF417 symbol contains several fields, each field separated from the next field by a character. It is then possible for an application program to properly parse the data obtained from the bar code symbols into the fields of the application for eventual entry into the database.

Referring to FIG. 5, at step 100, the operating characteristics of the at least one mobile computer terminal are configured to correspond to data field characteristics required by the application program running on the host computer. This may comprise configuring the operating characteristics so the mobile computer terminal acts as a terminal emulator as is known in the prior art. Commands are sent from the host to the mobile computer terminal indicating which in which mode of emulation the terminal should be. For example, it may be advantageous to have a bar code scanning system which is capable of scanning several different types of bar code symbols. Therefore, the host may send a "0" if PDF417 scanning should be disabled (for scanning one dimensional bar code symbols). It may send a "1" if the terminal should be in contiguous mode only, where scanned PDF417 bar code symbols are a single block in an input field, limited to 500 bytes or less. It may send a "2" if the terminal should be in large mode only, which allows scanning of single PDF417 bar code symbols larger than 500 bytes and multiple, linked PDF417 bar code symbols to form one contiguous data block by storing the data in a file on a RAM disk on the terminal which is sent to the host computer as a single file. It may send a "3" if the terminal should be in separator mode only, which allows the data scanned from one PDF417 bar code symbol to fill in a multiple field terminal emulation screen form by the host examining the bar code symbol for a separator character to indicate where the data breaks are to fill the fields. The terminal may then respond by sending a message to the host when it has received the command mode information and is ready to begin scanning data.

At step 102, the at least one mobile computer terminal is utilized to automatically acquire data from bar code symbols at the remote site in response to a data acquisition program running on the at least one mobile computer terminal. How the data is acquired depends on how the terminal was configured (in the case of PDF417 bar code symbol readers, which mode the terminal is acting in). An additional step may be added here for validity checking. This permits the system to make sure all of the fields in the scanned bar code symbol and the application match. A separator mode PDF417 bar code symbol that is scanned in may contain ten fields, while the application may contain only nine. The user could then be alerted that the bar code symbol is in the wrong format (or that there was an error in scanning) to prevent erroneous data from being entered into the application. At step 104, the acquired data is transformed into a data structure in the mobile computer terminal in accordance with the data characteristics required by the application program running on the host computer. Finally, at step 106, the data structure is transferred to the host computer over a wireless network.

Figure 6:
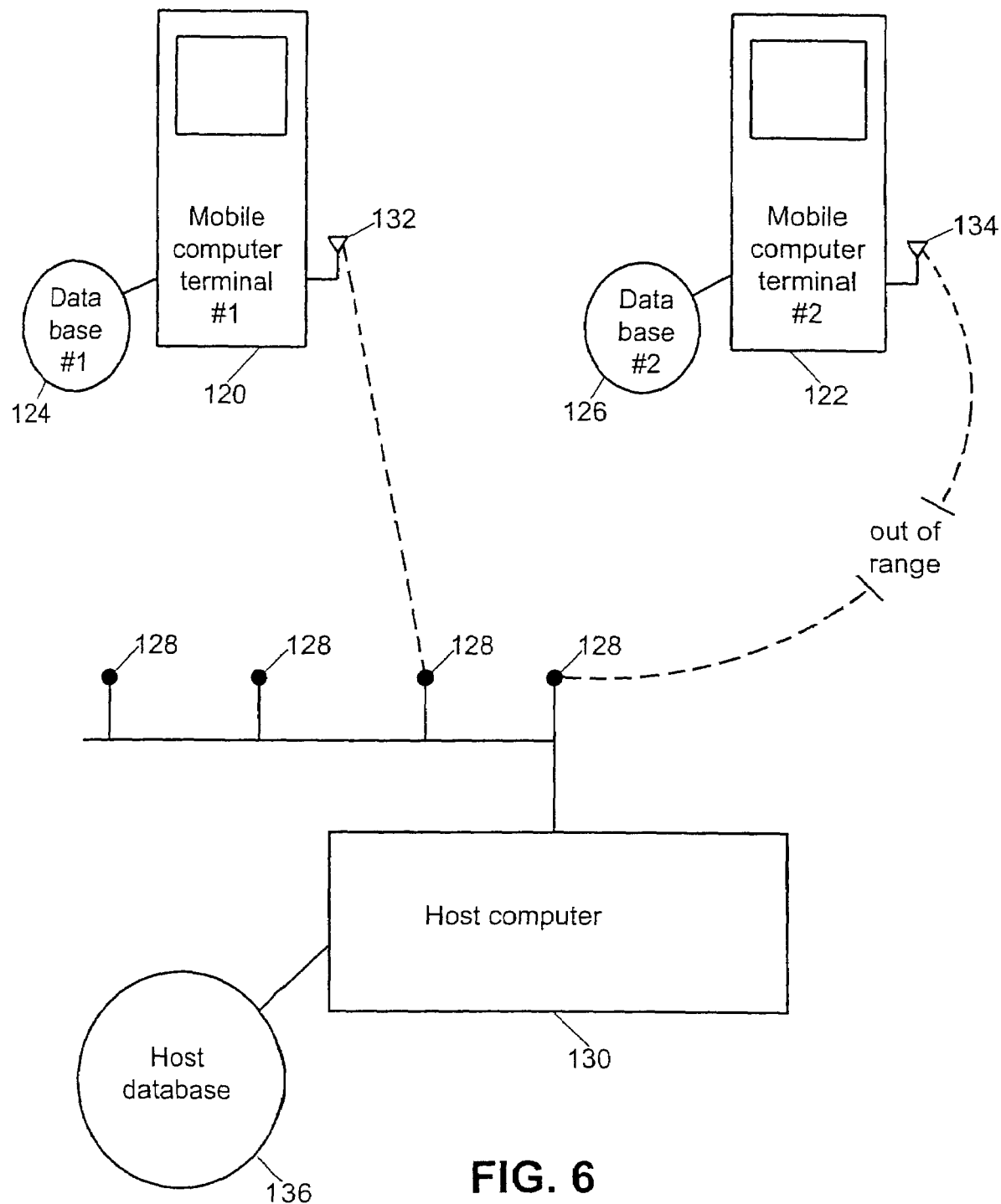
FIG. 6 is a block diagram of a network having a host computer and at least one mobile computer terminal in accordance with a second embodiment of this invention.
Figure 7:
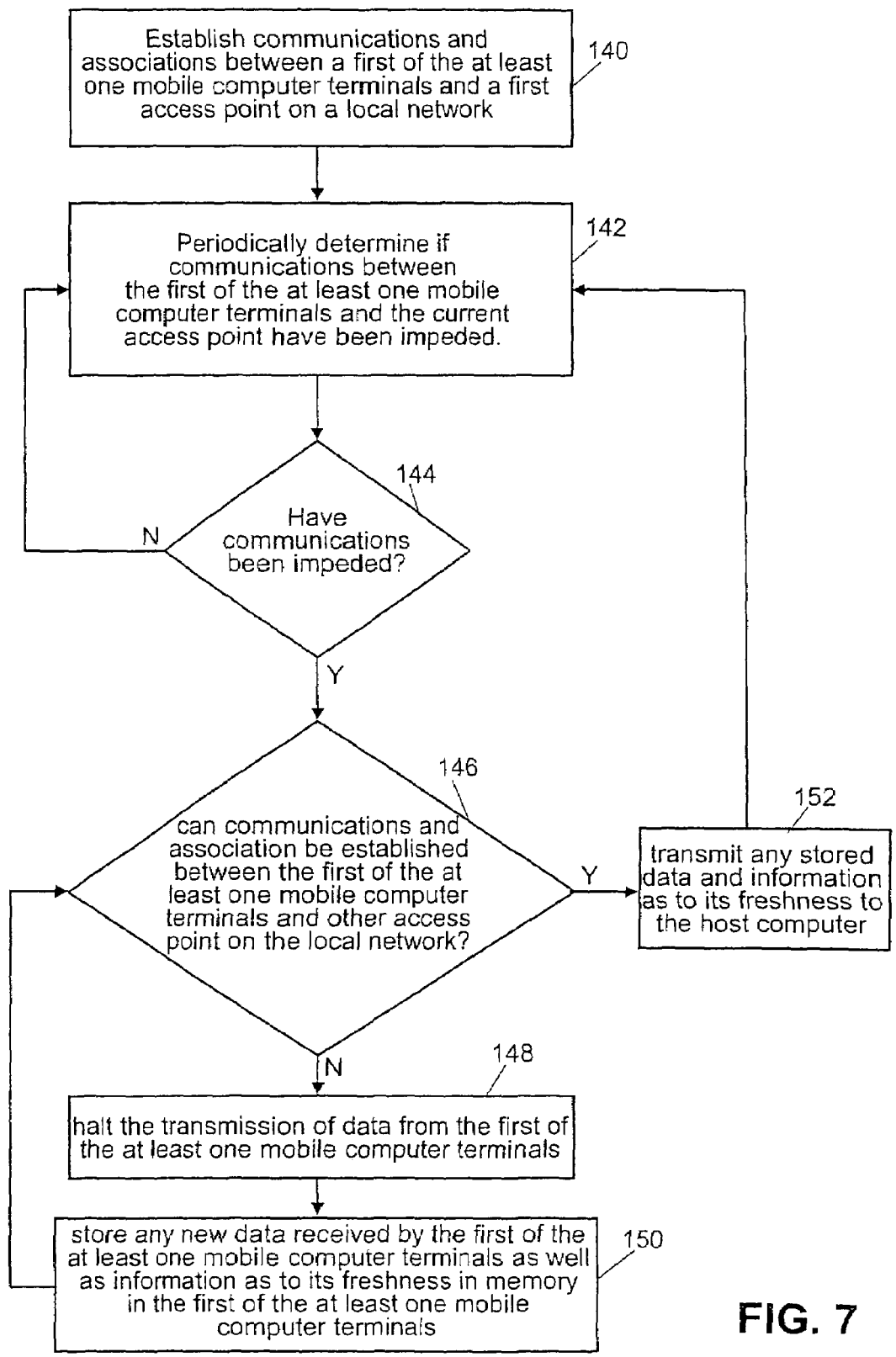
FIG. 7 is a flow diagram depicting a method of communication between a host computer and at least one mobile computer terminal using a batching method when at least one mobile computer terminal in accordance to a second embodiment of this invention.

FIG. 6 depicts another embodiment of the present invention. It is possible to avoid the potential loss of data that occurs when a mobile computer terminal goes out of range of the access points or communication is otherwise impeded by equipping each mobile computer terminal 120, 122 with a database 124, 126. When the mobile computer terminal goes out of range of all the access points 128, all data collected during that time is stored in the mobile computer terminal database 124, 126. When the mobile computer terminal re-establishes a connection, the data collected may be uploaded to the host computer 130 via the transmitter/receiver 132, 134 for eventual storage in the host database 136 without any loss of data. This process may be referred to as switching to batch mode. This method is depicted in FIG. 7.

At step 140, communications and association between a first of the at least one mobile computer terminals and a first access point on a local network is established. At this point, the mobile computer terminal becomes part of the network and is able to transmit all of the data it receives directly to the host computer as soon as it receives it. At step 142, the at least one mobile computer terminal periodically checks if communications between the first of the at least one mobile computer terminals and the access point have been impeded. This may be asynchronous polling based on the detection of RF broadcast signals. Basically, the terminal listens and if it doesn't hear anything from the access point then it assumes communications have been impeded. At step 144, if communications not been impeded, the process returns to step 142 to continue periodically scanning for communications. If communications have been impeded, however, the process moves to step 146, where it is determined whether or not communications and association can be established between the first of the at least one mobile computer terminals and one of the other access points on the local network. If this can be accomplished immediately, there will likely be no loss of data. However, if communications and association cannot be established with any of the access points on the local network, the mobile computer terminal is cut off from the network, and there is a potential for the loss of important data.

At step 148, the transmission of data from the first of the at least one mobile computer terminals is halted. Then at step 150, any new data received by the first of the at least one mobile computer terminals is stored in memory in the mobile computer terminal. This prevents any data from being lost. Information regarding the freshness of the data is also stored at this point. This may comprise time stamping the data using an extra field in the data structure to store information as to the precise time the data was received. The process then returns to step 146, where communications and association with any of the access points on the local network is again attempted. This loop continues until communications are re-established. Then at step 152, synchronization and reconciliation is performed to update the information stored in the mobile computer terminal to the host computer, along with the data freshness information so that the host computer may make proper determinations as to the data's reliability and ranking.

Synchronization and reconciliation may involve comparing the database on the mobile computer terminal with the database on the host computer, and updating information on both databases accordingly. For example, in the inventory example, if a sale was made on the mobile computer terminal during a period when the terminal was out of range, the host computer database will have to be updated with the number of units sold during the synchronization and reconciliation stage. Similarly, the mobile computer terminal database will have to be updated with information about the current inventory in case the inventory was adjusted (through sales from other mobile computer terminals or for other reasons) during the period that the terminal was out of range.

Figure 8:
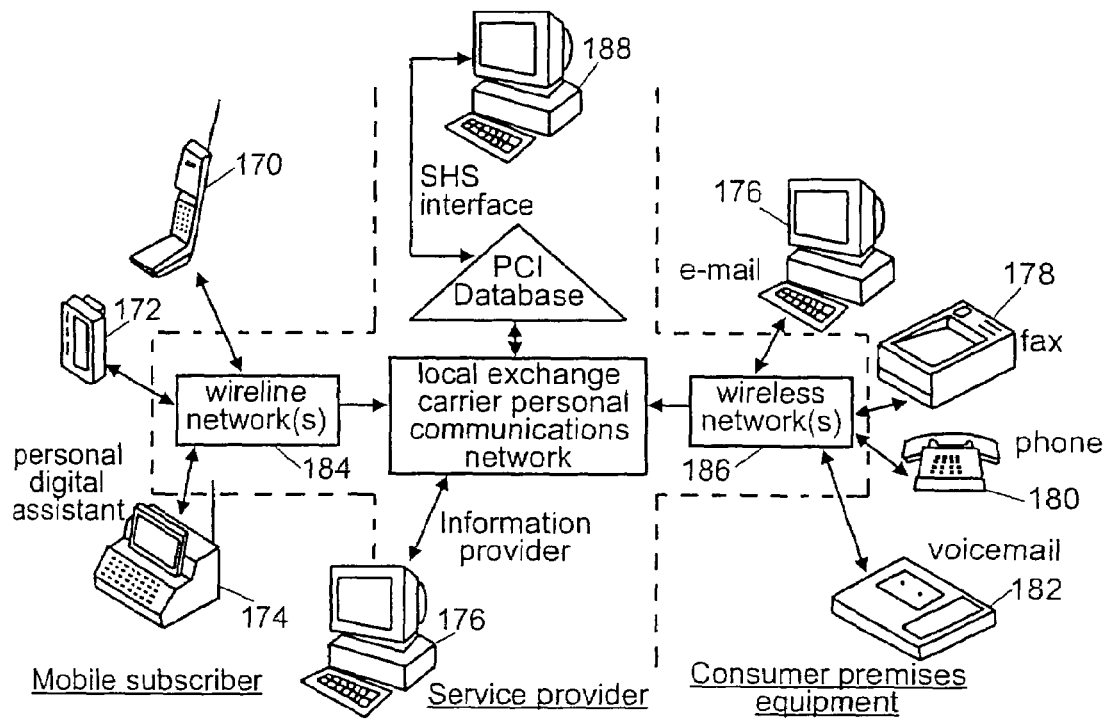
FIG. 8 is a diagram of a network in accordance with a third embodiment of this invention.

FIG. 8 is a diagram illustrating another embodiment of the present invention, utilizing other equipment in place of mobile computer terminals. This may include such peripherals as cellular phones 170, pagers 172, personal digital assistants 174, desktop computers 176, fax machines 178, phones 180 and voice mail machines 182. All communicate through one or more wireless networks 184, 186 to a host computer 188.

Another potential piece of equipment that may be used in place of or in conjunction with a mobile computer terminal is a portable multi-technology card reader. Currently, there are several different types of cards that require scanning or reading in order to access data or authenticate the card. These include credit cards, driver's licenses, military identifications, and so on. Currently, the most popular type of card/scanning method is the swipe card. In these systems, the card is wiped through a machine which reads information off a magnetic stripe on the card. The information, however, may be encoded in many different ways. Additionally, there are several new types of cards emerging in the marketplace, including smart card and biometrics cards. Therefore, in another embodiment of the present invention, at least one of the network devices is a portable, multi-technology card reader capable of scanning any type of card. A host computer may then be configured to read specific types of cards and encoding schemes, such as PDF417 for cards and documents, magnetic stripe cards, smart cards, and even fingerprints. This allows for easy upgradeability when a new card technology or new encoding system is designed. The portable nature of the reader also permits more uses than previous card readers. For example, instead of a police officer taking a driver's license off a detained motorist and swiping it though a machine in his patrol car, he may instead simply scan the card using his portable scanner right at the motorist's car.

Figure 9:
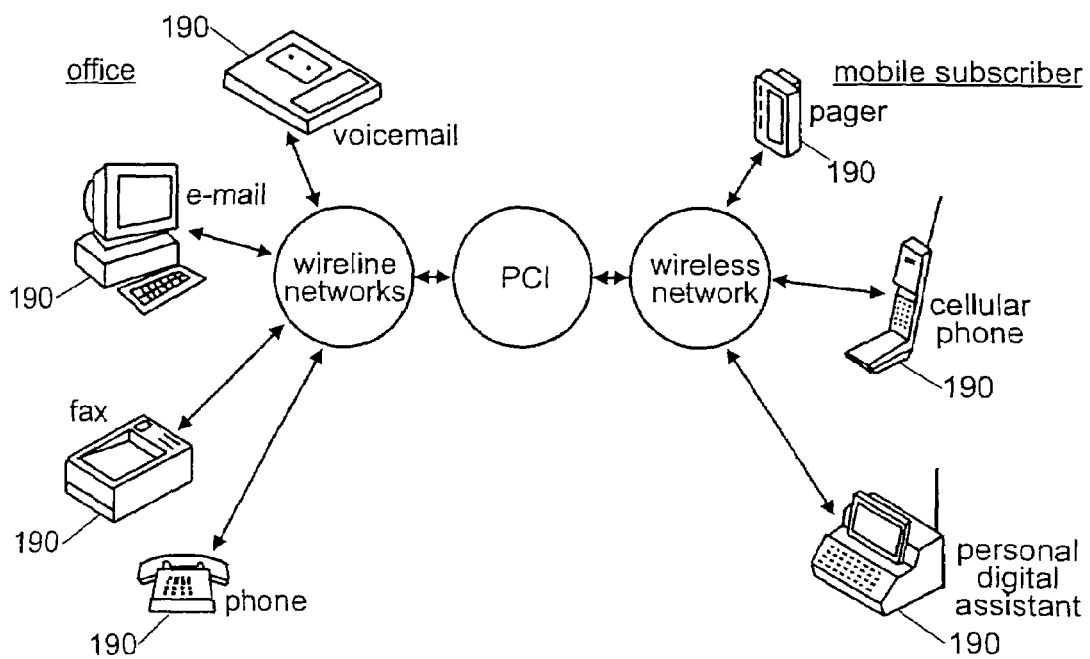
FIG. 9 is a diagram of a network in accordance with a fourth embodiment of this invention.

FIG. 9 is a diagram illustrating another embodiment of the present invention. This embodiment is similar to the one in FIG. 6. Here, however, the host computer has been removed, so the network allows direct communication from one peripheral 190 to another.

Figure 10A:
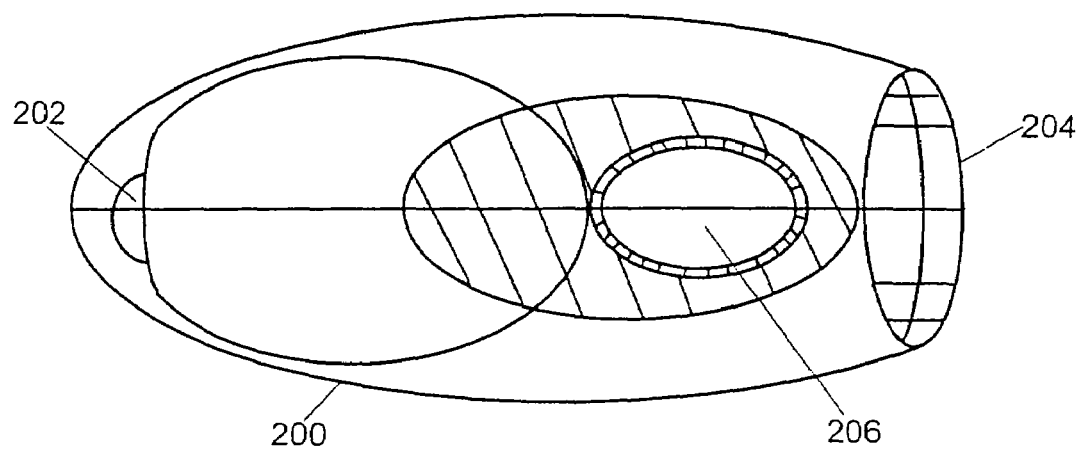
FIG. 10A illustrates a top view of a portable scanning device in accordance with this invention.
Figure 10B:
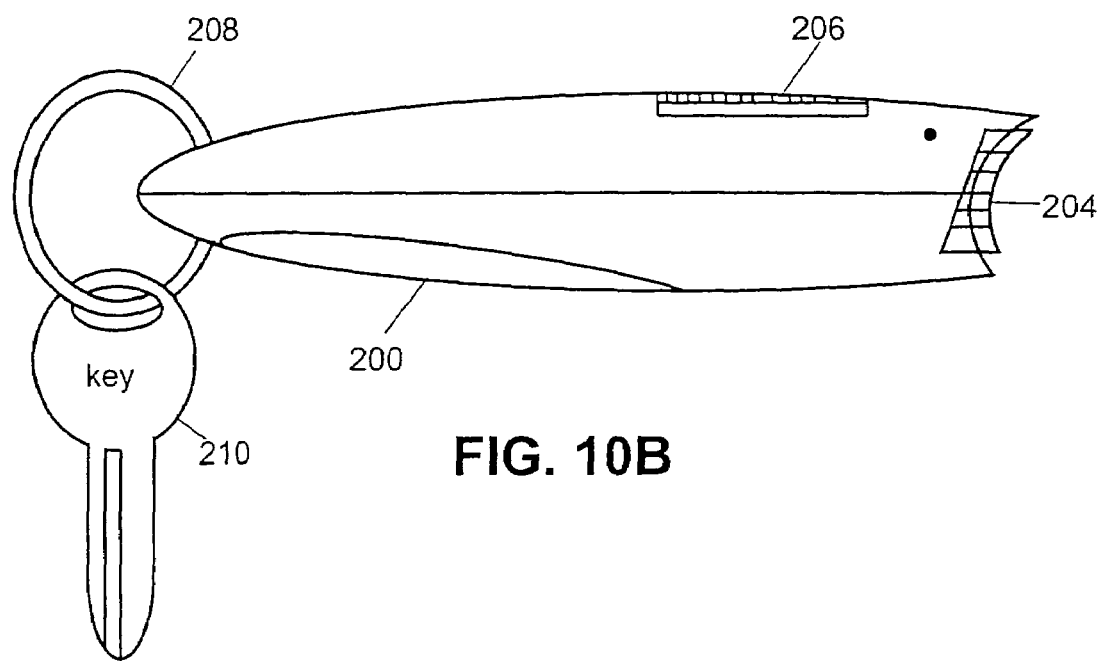
FIG. 10B illustrates a side view of the portable scanning device in accordance with this invention.

FIGS. 10A, 10B, 10C, and 11 illustrate another embodiment of the present invention. FIG. 10A is a diagram depicting a top view of a portable scanning device that may be used to scan and store data. Scanner 200 has a keyhole 202 for easy attachment to a keychain. By allowing the user to place the scanner on a keychain, the portability of the scanner increases, as it is much easier for a user to carry it around without losing what is potentially an expensive piece of equipment. The scanner is positioned so that the bar code symbol is in front of the scanner face 204. Then button 206 is depressed and the symbol is scanned, with the data being stored in memory contained in the scanner. FIG. 10B is a diagram depicting a side view of the scanner. In this view, a keychain ring 208 with a key 210 attached is shown attached to the scanner 200. FIG. 10C is a diagram depicting a perspective view of the scanner. FIG. 11 is a diagram illustrating how the information on the memory chip is transferred to a host computer. The scanner 200 may be placed in a base unit 212, which may be connected to a computer terminal. This allows the information from the memory in the scanner 200 to be read out and transferred to whatever application the user deems necessary.

In another embodiment of the present invention, each mobile computer terminal may have a separate network address along with a display screen capable displaying a graphical image in a hypertext language (such as HTML). The host computer (or base unit, depending on the implementation) may have a second network address. The base unit may then transmit a message to the network address corresponding to the mobile computer terminal, the message being represented by a graphical image in a hypertext language. The mobile computer terminal may then interpret the message and automatically display the graphical image on the display.

This embodiment may be very helpful in such applications as pagers. Each of the pagers may be the mobile computer terminal with a display. When the user is paged, the display turns on revealing a hypertext language page. The page may contain information or graphics that the user should look at, or it may also contain a menu, wherein the user may select and be transferred to other web pages containing information. Using this mechanism, it is possible to use the pager for all sorts of different applications, such as receiving alphanumeric messages from family members, getting periodic updates on stock quotes or sports scores, or viewing graphical files sent from a business colleague. To that end, the mobile computer terminal may include a liquid crystal display (LCD). The LCD could instead be used to display the current time or date if the designer so wishes. The display of time and date would be most practical in an embodiment used with a keychain.

The mobile computer terminals may also be configured as other commonly used peripherals, such as wireless IP phones. An example of this is the NetVision® wireless IP phone system from Symbol Technologies, Inc.

One problem that may arise in the utilization of batch mode, is that it is possible for resynchronization to take a great deal of time. This normally occurs when the user does not realize that he is out of range, and continues to input data into the mobile computer terminal as if it was still transmitting to the host computer. While the batch mode design prevents the loss of data, the more data that is entered during this "down time", the longer resynchronization will take when the mobile computer terminal is brought back into range.

To remedy this problem, the mobile computer terminal may be configured with an application that alerts the user when the mobile computer terminal goes out range. This allows the user to realize that he is out of range before he inputs data into the terminal. This application may be stored in firmware or a similar medium, where it may periodically check to make sure that there is still a valid link to an access point. Then, if the link has been broken, a message may be flashed on the display, such as "out of range". The user may then have discretion as to whether to input the data and have it stored in batch mode, or wait until the mobile computer terminal is brought back into range, which would save on resynchronization time.

Another problem that arises in the use of batch mode occurs when it is necessary mobile computer terminal to send a message at a particular time. While this application has dealt mostly with the case where a mobile computer terminal cannot communicate with an access point because it is out of range, it should be recognized that the mobile computer terminal may not be able to communicate with an access point simply because it is in a "sleep" mode. It is common for mobile computer terminals to have power conservation systems in order to save battery power. It is therefore typical for a mobile computer terminal to go into a "sleep" mode, where all its processing functions are shut down, when the mobile computer terminal is not used for a certain period of time. This presents a problem in cases where it is necessary for the mobile computer terminal to send a message at a certain time.

One example of this is in the limited leasing of Internet Protocol (IP) addresses. Generally, mobile computer terminals are granted an IP address on a network for only a limited amount of time. This is because the number of possible IP addresses is limited and most mobile computer terminals will only be using the network for a limited amount of time. Typically, a server assigns an IP address to the mobile computer terminal for a limited amount of time, and then specifies that if the user requires additional time, the user must beg for an extension at an appropriate time. For example, the user may be required to beg for an extension at a time exactly halfway through the initial leased period. If the user does not beg for an extension at that time, he may beg for an extension at a time halfway through the remaining time (¾ of the way through the initial leased period), and if he doesn't beg at this time, at halfway through the remaining time (⅞ of the way through the initial leased period) and so on. At one minute remaining, the DHCP server may give up and disconnect the user.

Figure 12:
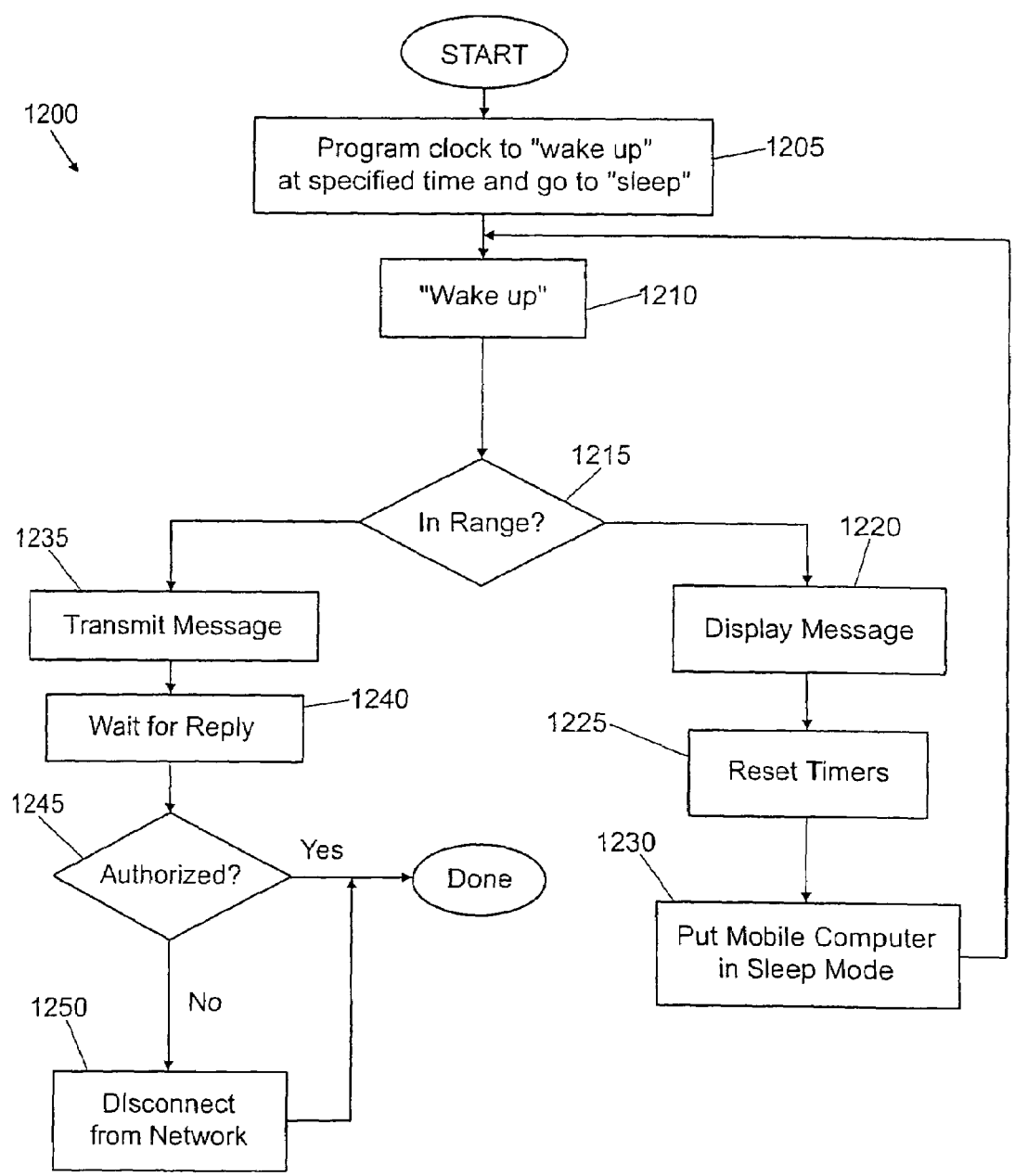
FIG. 12 illustrates a flow diagram of a method for "waking up" a mobile computer terminal from a "sleep mode" to transmit a message in accordance with this invention.

The problem arises when the mobile computer terminal is in "sleep" mode when the time for begging arrives. This problem may be remedied by utilizing a timer or clock in the mobile computer terminal and process 1200 illustrated in FIG. 12. The computer terminal may program the timer or clock before it goes to "sleep" to wake it up at a specified time in order that it may send the begging message in step 1205. The timer or clock utilizes very little power, and most mobile computer terminals already contain such a clock or timer used for other purposes. The mobile computer terminal "wakes up" in step 1210. The mobile computer first checks to determine if it is within range in step 1215. If the mobile computer terminal is not in range, the mobile computer terminal displays a message to the user in step 1220, resets the wake-up timers for the next "scheduled" beg time in step 1225, and then goes to sleep in step 1230. If the mobile computer is within range, it sends the lease renewal message in step 1235 and awaits a response from the DHCP leasing server in step 1240. If the lease time has expired and the mobile computer cannot send a renewal or is not granted a renewal from the DHCP server in step 145, the mobile computer disconnects its IP attachment and no longer uses the granted leased address in step 1250 and process 1200 ends. When the "sleeping" mobile computer who has surrendered its leased IP address is woken up by the user, the user is informed about a lost IP address and is given an option to reconnect to its host by first accessing the DHCP server for an IP address and reconnecting any active user application to the host computer.

Additionally, while this application refers to IP addressing, there are many other possible types of network addressing that this problem and solution may arise in as well.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for preventing a mobile computer from being disconnected from a network comprising:
   determining a termination time of a network connection for said mobile computer;
   setting a timer for a time prior to said termination time responsive to said determination of said termination time;
   setting said mobile computer into a sleep mode responsive to setting of said timer;
   setting said mobile computer to an active mode responsive to said timer expiring;
   transmitting a message from said mobile computer to a host computer in said network responsive to said mobile computer being set to said active mode wherein said message is a request for an extension of a lease of an Internet Protocol Address for said mobile computer;
   determining whether said mobile computer is out of transmission range of said host computer;
   displaying an out of range message on a display screen of said mobile computer responsive to a determination that said mobile computer is out of said transmission range;
   setting a re-transmit timer responsive to a determination of said mobile computer being out of said transmission range; and
   re-transmitting said message responsive to an expiration of said re-transmit timer.

2. The method of claim 1 wherein said message is a lease renewal message.

3. A mobile computer terminal comprising:
   means for determining an expiration time for a network connection for said mobile computer terminal;
   means for setting a wake-up timer that expires prior to said expiration time;
   means for setting said mobile computer terminal to a sleep mode responsive to said wake-up timer being set;
   means for setting said mobile computer terminal to an active mode responsive to said wake-up timer expiring;
   means for transmitting a message to said network prior to said expiration time responsive to said mobile computer terminal being set to an active mode wherein said message includes a request to extend a lease of an Internet Protocol Address for said mobile computer terminal;
   means for determining whether said mobile computer is out of transmission range of said host computer;
   means for displaying an out of range message on a display screen of said mobile computer responsive to a determination that said mobile computer is out of said transmission range;
   means for setting a re-transmit timer responsive to a determination of said mobile computer being out of said transmission range; and
   means for re-transmitting said message responsive to an expiration of said re-transmit timer.

4. The mobile computer terminal of claim 3 wherein said message is a lease renewal message.

5. A mobile computer terminal comprising:
   a transceiver unit for transmitting and receiving messages;
   a hand-held image scanner;
   a processing unit;
   instructions for directing said processing unit to:
      read an image from said hand-held image scanner,
      transform data corresponding to said image,
      generate a data message including said data, said data message having a format and ordering expected by a host computer system,
      transmit said data message to said host computer system,
      determine an expiration time for a connection time between said mobile computer terminal and said host computer system,
      set a timer to expire prior to said expiration time,
      set said mobile computer terminal to a sleep mode responsive to setting said timer,
      set said mobile computer terminal to an active mode responsive to an expiration of said timer,
      transmit a connection message to said host computer system prior to said expiration time responsive to said mobile computer terminal being set to an active state wherein said connection message requests an extension of a lease of an Internet Protocol Address for said mobile computer terminal,
      determine whether said mobile computer terminal is out of transmission range of said host computer,
      display an out of range message on a display screen of said mobile computer terminal responsive to a determination that said mobile computer is out of said transmission range,
      set a re-transmit timer responsive to a determination of said mobile computer terminal being out of said transmission range, and
      re-transmit said message responsive to an expiration of said re-transmit timer; and
   a media readable by said processing unit that stores said instructions.

6. The mobile computer terminal of claim 5 wherein said connection message is a lease renewal message.

7. A method for transmitting data between a mobile computer terminal and a host computer system wherein said mobile computer terminal includes a transceiver unit for transmitting and receiving messages, said method comprising:
   reading an image from said hand-held image scanner;
   transforming data corresponding to said image;
   generating a data message including said data, said data message having a format and ordering expected by a host computer system;
   transmitting said data message to said host computer system;
   determining an expiration time for a connection time between said mobile computer terminal and said host computer system;

setting a timer in said mobile computer terminal to expire prior to said expiration time;

setting said mobile computer terminal to a sleep mode responsive to setting said timer;

setting said mobile computer terminal to an active mode responsive to an expiration of said timer;

transmitting a connection message from said mobile computer terminal to said host computer system prior to said expiration time responsive to said mobile computer terminal being set to an active state wherein said connection message requests an extension of a lease of an Internet Protocol Address for said mobile computer terminal;

determining whether said mobile computer terminal is out of transmission range of said host computer;

displaying an out of range message on a display screen of said mobile computer terminal responsive to a determination that said mobile computer is out of said transmission range;

setting a re-transmit timer responsive to a determination of said mobile computer terminal being out of said transmission range; and re-transmitting said message responsive to an expiration of said re-transmit timer.

8. The method of claim 7 wherein said connection message is a lease renewal message.

* * * * *

UNITED STATES PATENT AND TRADEMARK OFFICE
CERTIFICATE OF CORRECTION

PATENT NO. : 7,206,849 B1  Page 1 of 1
APPLICATION NO. : 09/686123
DATED : April 17, 2007
INVENTOR(S) : Alex M. Gernert and Daniel L. Scheve It is certified that error appears in the above-identified patent and that said Letters Patent is hereby corrected as shown below:

On title page
Item # (63) should read --divisional of application No. 09/166,816, filed on October 5, 1998, now Pat. No. 6,694,366.--

Signed and Sealed this

Thirteenth Day of November, 2007

JON W. DUDAS
*Director of the United States Patent and Trademark Office*